3,586,497
Patented June 22, 1971

1

3,586,497
REDUCTION OF METAL CHLORIDE WITH
HOT HYDROGEN
Percival Gravenor, 5807 115th St., and Tyson Rigg, 4124 121st St., both of Edmonton, Alberta, Canada
No Drawing. Continuation-in-part of abandoned application Ser. No. 712,302, Mar. 11, 1968, which is a continuation-in-part of abandoned application Ser. No. 406,519, Oct. 26, 1964. This application June 18, 1968, Ser. No. 737,844
Int. Cl. C21b 15/00; C22b 23/02
U.S. Cl. 75—34                    7 Claims

ABSTRACT OF THE DISCLOSURE

In a method for reducing ferrous, nickel or cobalt chloride to the metal state, the chloride crystals are first formed into curviformed briquets. Beds of these briquets are reduced in a reactor using not hydrogen pre-heated to a temperature well above the melting temperature of the chloride. The hydrogen provides all the heat requirements for raising the briquets to reduction temperature and reducing them. In an optional feature, iron oxide may be admixed with the ferrous chloride prior to briqueting.

CROSS REFERENCES

This is a continuation-in-part of application Ser. No. 712,302, filed Mar. 11, 1968, now abandoned, which, in turn, was a streamlined continuation of application Ser. No. 406,519, filed Oct. 26, 1964 now abandoned.

BACKGROUND OF THE INVENTION

This invention relates to a process for reducing metal chloride with hot hydrogen to produce elemental metal.

Hot hydrogen reduction of metal chlorides, such as ferrous chloride, has long been known and discussed in the literature. For example, in U.S. Patent No. 2,418,148, the patentee Williams describes producing an iron aggregate by reducing ferrous chloride with hydrogen at a reduction temperature between 450° C. and the melting temperature of the ferrous chloride (about 670° C.). The result was obtained by placing a basket of ferrous chloride powder in a furnace, externally heating the furnace to bring its contents to reduction temperature, and then passing hot hydrogen through the furnace to reduce the ferrous chloride to iron.

However, when one attempts to scale up the known laboratory procedures into a commercially feasible operation, a number of serious problems arise which are not solved in the prior art and which have apparently prevented commercial exploitation of the reaction from taking place. For example, the known procedures involve reduction rates which are far too slow for commercial use.

SUMMARY OF THE INVENTION

We have developed a particular model of the reaction which, when its conditions and limitations are observed, provides a process which comprises a reasonable basis upon which to design a commercial plant. In order to simplify the description, the invention will only be described hereunder as applied to the production of iron.

The model was developed as a result of making the following observations, discoveries and conclusions:

(1) The hydrogen reduction of a bed of ferrous chloride powder is undesirably slow. This is mainly due to random channelling of the hydrogen flow through the bed.

(2) The time required for reduction of a bed of ferrous chloride may be greatly reduced by providing the material in briquet form. As a result of this change, channelling is controlled and the hydrogen flow is caused to permeate all portions of the bed.

(3) The reduction reaction proceeds through a briquet in the form of an advancing front. Since the reaction is endothermic, a heat shield is provided to protect unreduced ferrous chloride at the interior of the briquet. The temperature of the hydrogen used for reduction can be well above the melting temperature of the ferrous chloride without causing melting. A high reduction temperature may therefore be easily maintained to give rapid reduction. The product iron is, in practical fact, unaffected by temperature considerations since its melting point is well above the maximum reduction temperature which present day equipment limitations would permit one to use in the reduction step.

(4) External heating of the reduction reactor is undesirable. This is due to hte formation of hot spots adjacent to the reactor wall. These hot spots cause melting of the ferrous chloride in the absence of reductant.

Now, since the ferrous chloride is protected by the reaction front, very hot hydrogen can be used in the reduction step. This means that it is feasible to use the hydrogen gas itself as the heating medium, particularly when good hydrogen flow distribution is achieved by using briquets. We have found this to be an efficient system which avoids the problem of hot spots since the heat and reductant arrive at any point within the reactor at the same moment.

Broadly stated, the process comprises the following novel combination of steps: agglomerating a particulate ferrous metal chloride, selected from the group consisting of ferrous, nickel and cobalt chlorides, into curviform agglomerates; accumulating a plurality of these agglomerates to form a porous bed within a reactor; and reducing the metal chloride to metal by flowing hot hydrogen through the bed, the said hydrogen being supplied in an amount sufficient to provide all the heat requirements necessary to effect reduction.

In an additional feature of the invention, an iron oxide, in particulate form, may be admixed with the ferrous chloride prior to agglomeration. This step has several advantages: As is well known, particulate iron oxides have not been reduced in hot hydrogen on a continuing commercial scale, although the procedure has often been investigated. The main problem has been the undesirable tendency of the iron oxide particles to stick together to form dense agglomerates. This can be serious when they are, for example, being reduced in a fluid bed. By admixing the iron oxide particles with particulate ferrous chloride and then briqueting the mixture, the oxide particles are fixed relative to one another. As a result, they are quickly reduced by the hot hydrogen gas penetrating the porous briquet. Additionally, an iron oxide is more rapidly reduced at lower temperatures than is ferrous chloride. Maximum utilization of the heat content of the hydrogen may therefore be realized by providing iron oxides in the briquet. Finally, the output of product iron per cubic foot of reactor capacity can be increased by providing some of the iron in the form of an oxide, since iron oxide is more dense than ferrous chloride.

DESCRIPTION OF THE PREFERRED EMBODIMENT

In the remainder of this description, the word "briquets" will be used to describe agglomerates formed by applying mechanical force to powder to compress the particles together so that mechanical interlocking will provide the necessary cohesiveness and compressive strength required of the product. However, the word "briquets," as used in deciding the scope of the invention, is to be given a broad enough meaning so as to cover any agglomeration of metal chloride particles, howsoever formed, which has sufficient compressive strength and cohesiveness to be useful in the operation of this process.

STARTING MATERIAL

The source of the ferrous chloride powder is not critical to the success of the invention.

It is, however, preferable to use a warm, moist, hydrated form of ferrous chloride powder which contains between 1 and 2 waters of hydration. Warm, moist ferrous chloride powder compacts into briquets which are stronger when compared with briquets formed from identical powder compacted in a dry, room temperature condition. Partial dehydration of the ferrous chloride is carried out to avoid the problem of having the material dissolve in its own water of hydration when heated for reduction. Additionally, dehydration is advantageous in that it reduces the amount of water introduced to the reduction reactor. The reduction exhaust gas from the reactor will be comprised of hydrogen, hydrogen chloride and water. It is assumed that the exhaust stream will be recycled to hydrogen chloride absorber to regenerate pure hydrogen and recover hydrogen chloride. It will be self evident that the less water there is in the exhaust stream, the more concentrated will be the recovered hydrogen chloride.

One suitable known method for providing such a starting material involves:

(1) Leaching iron-containing material, such as scrap or concentrate, in an acid-resistant vessel containing a hot aqueous solution of hydrochloric acid;

(2) Separating the leach solution from the insoluble residue;

(3) Crystallizing ferrous chloride from the leach solution by evaporating it under vacuum conditions;

(4) Recovering the ferrous chloride crystals and washing them in a water spray to remove surface impurities; and (5) Partially dehydrating the ferrous chloride crystals, which will usually be associated with about 4 waters of hydration, in a drier to a condition wherein they are associated with about 1.7 waters of hydration. The partially dehydrated crystals will preferably be discharged in a damp condition from the drier at a temperature of about 100° C. In this state, the crystals are particularly suitable for use as feed for the process.

AGGLOMERATING

Thus use of agglomerates or briquets is essential to the success of this invention. Briqueting ensures the provision of controlled permeability and porosity within the bed. This results in good hydrogen distribution throughout the bed and, therefore, a satisfactory residence time for complete reduction of the bed to the metal state. Additionally, the pressure differential used to drive the hydrogen through the bed is small in comparison to the differential required with a powder bed. The importance of this feature will become apparent hereinbelow.

As a result of having improved the hydrogen distribution and reduced residence time, the hydrogen itself can be used as the means for providing all the heat needed for the reduction operation. This has resulted in gains in heating efficiency and the substantial elimination of hot spots.

The briquets will preferably be formed by compacting the warm, moist ferrous chloride powder using mechanical means. When so formed, they have reasonable strength in compression, both before and after reduction, at reaction zone temperatures. It will be self evident that the stronger the briquet, the greater will be its ability to withstand crushing when it forms part of a bed. Crushing is to be avoided as it will naturally have a direct effect upon the porosity and permeability of the bed.

We have found that the briquets tend to interfere with one another during reduction. For example, if one piled one briquet upon another and reduced the pair, examining them periodically, it would be found that a zone in each briquet, adjacent to the area of contact, was very slow to be reduced. It is believed that this result arises from the concentrating of hydrogen chloride gas in the narrow void space defined between the briquets adjacent to their area of contact. This concentration tends to reverse the reduction reaction. It is one good reason for rounding the briquets, to minimize the area of contact, and to use briquets of substantial size. However, there is a more important reason for rounding the briquets. Rounding ensures porosity and permeability within the bed. It would, of course, be best to use spherical briquets, however, spherical briquets are difficult to make. We have had good success using conventional pillow and pear-shaped briquets.

It is preferable to use briquets of substantial size. However, there is a limitation to the size which one can use. If the size is too large, the reducing gas will be too far removed from the briquet core, as a result residence time will become excessive. We have had good success with dense briquets weighing between about 10 and 30 grams.

According to our presently preferred mode of agglomerating, we form 15 to 30 gram, curviformed briquets having a porosity of about 10 percent. This is done by feeding hot, moist ferrous chloride, as previously described, into a two roll press operating at a rod thrust of 33 tons. The ferrous chloride is not very malleable and therefore requires a high compression ratio in order to produce a briquet having desirable strength characteristics. We have successfully used a compression ratio of 3 to 1. The apparent density of the briquets produced is about 2.3 grams per cubic centimetre. When these briquets are formed into a bed, it has a porosity of about 50 percent. When we reduce these briquets in a fixed bed reactor having a diameter of 3 feet 6 inches we find that beds, which extend across the interior of the reactor and have thicknesses up to about 2 feet 6 inches, can be successfully reduced without serious problems caused by crushing or breakage.

REDUCTION

A plurality of the ferrous chloride briquets are placed within a suitable reactor. We have tried reducing the chloride in fluid bed reactors; however our best results have been obtained using a fixed bed reactor. A number of problems arise when a fluid bed reactor is used. For example, the iron produces agglomerates at reaction temperatures, large amounts of ferrous chloride vapour are carried out in the hot gas and the density of the particles changes considerably during reduction with the result that maintenance of the correct fluidization velocity in rendered difficult. These problems are substantially avoided when the briquets are reduced in a fixed bed reactor. We have, for example, successfully used a 10 foot by 3 foot 6 inch vertical reactor made of stainless steel. The briquets are stacked in beds about 2 feet thick on each of three vertically spaced grids mounted on a central support. These horizontal grids extend fully across the reactor, as do the beds of briquets. An inlet for hot hydrogen is provided at the base of the reactor and an exhaust outlet at its top.

The thickness of the beds used within the reactor should be carefully considered. There are a number of factors which may become involved in deciding on the thickness to be used.

First, the size of reactor and the permissible pressure drop across the bed will have an influence on the choice of bed thickness. If the cross-sectional area of the reactor is small, a large pressure drop is undesirable. It is observable that the hydrogen flow channels along the reactor wall. If a large pressure drop is used, this chanelling flow will tend to fold the bed inwardly or part it from the wall surface. As a result, wall channelling is intensified. A thick bed will, of course, result in a large pressure drop. One will therefore tend to use thin beds in reactors of substantial cross-section.

Second, the bed thickness selected should be such that crushing of the bottom layer of iron product briquets is avoided. At reduction temperatures, these briquets are relatively weak. Crushing them will naturally reduce the permeability of the bed. It is therefore desirable to use thin beds to avoid this problem. When considering this factor, one will have to be thoroughly familiar with the strength characteristics of his particular product's briquets; they can vary considerably.

By trial and error, we have found that 15 to 30 gram pillow-shaped briquets, measuring 1½ by ⅞ by ½ inches and made in accordance with the foregoing description, can be successfully reduced within a 3 foot 6 inch diameter reactor into which hot hydrogen is fed at a pressure of 3 p.s.i.g. without crushing if a bed thickness of 2 feet is used.

The purity of the hydrogen used is not a critical matter. Impurities will naturally be undesirable. However, we have successfully used hydrogen manufactured from natural gas for reduction. This hydrogen contains up to 15 percent by volume hydrocarbons and 36 percent by volume water. The degree of purity will largely be set by the specification for the iron powder and by economic considerations.

The hot hydrogen will be supplied to the reactor in an amount sufficient to reduce the ferrous chloride to iron and to provide the total heat requirements for the reduction operation. The phrase "total heat requirements for reduction" is intended to mean the sum of:

(1) The amount of heat needed to raise the briquets to reduction temperature;

(2) The amount of heat needed to evaporate residual water; and (3) The amount of heat needed for the endothermic reduction reaction which, at 600° C. may be written as follows: $FeCl_2+H_2=Fe+2HCl+34K$. calories per gram mole of Fe.

At 600° C., the total theoretical heat requirement is about 60 K. calories per gram mole of iron produced.

It is undesirable to conduct the reduction reaction at temperatures below 550° C. for several reasons. First, the iron powder product produced when the reaction is conducted at lower temperatures is pyrophoric. Second, the rate of reaction is too low to be of interest. Finally, the equilibrium hydrogen chloride content at 550° C. is only 5 percent; this is about as low as one can go with this factor and still have a process of economic interest.

Theoretical calculations and visual examination of partially reduced briquets have shown that the reduction reaction progresses along an advancing front. The front eats its way inwardly to the core of the briquet. Experimental observations have shown that the unreduced portion of a briquet is not affected when subjected to reduction by hydrogen heated to a temperature well above 670° C. In other words, the reaction front serves as a heat shield for the unreduced ferrous chloride. As a result, the reductant can be heated to very high temperatures. We have found that reactor equipment limitations restrict the inlet temperature of the hydrogen to about 800° C.

In practice, the inlet temperature will have to be greater than 550° C. Preferably it will be greater than 700° C. With an inlet temperature of about 800° C. and an exhaust temperature of about 550° C., we find that between 30 and 40 moles of hydrogen are required to completely reduce one mole of ferrous chloride, the heat requirements all being supplied by the reductant.

Providing all the heat by way of the reductant eliminates the problem of hot spots. We encountered this problem when reductions were conducted by placing briquets on a belt and heating them by radiation from a surrounding hot pipe. The ferrous chloride adhered to and melted on all hot surfaces which had been heated by radiation. This melted material did not reduce.

The gas velocity through the reactor will have an influence on the reduction rate. To obtain maximum reduction rate, the gas velocity over the briquet should be sufficiently high to make the film resistance to heat and mass transfer at the briquet surface negligible in comparison to the resistance to diffusion through the sponge iron layer on the outside of the partly reduced briquet. For briquets of 1 to 2 inches in diameter, the velocity has been found experimentally to be about 2 feet per second. As the flow resistance of the bed is large, and increases as the reduction proceeds, it is desirable to use the minimum possible velocity. Conversely, a high gas velocity is needed to prevent water evaporated in one part of the bed from condensing elsewhere. At low superficial gas velocities, the gas boundary layer at the briquet surface cools below the saturation temperature of the gas, especially in zones where the bed porosity is lowest as a result of uneven packing. Condensation of water in these zones produces impervious masses of ferrous chloride which do not reduce in any reasonable time. Operation in the region of 3–5 feet per second has been found adequate to prevent condensation of moisture in a small bed having a thickness of 2 feet and a diameter of 3 feet 6 inches.

The product of the reaction is a sponge iron having an apparent density of about 0.8 and a porosity of about 80–90 percent. It is unusually pure as illustrated in the analysis given in the following examples.

The invention will now be illustrated by the following examples:

Example I

Scrap iron, having the following approximate composition:

| | Percent |
|---|---|
| C | 0.08–0.13 |
| Ni and Cu | 0.01–0.05 |
| Mn | 0.6–1.0 |
| S | 0.08–0.33 |
| Fe and Fe oxides | Balance | was fed into a reinforced plastic vessel together with 20 percent by weight aqueous HCl which had been heated to 90° C. The scrap iron dissolved in the acid with evolution of hydrogen in an exothermic reaction which kept the solution at 85°–95° C. A solution of ferrous chloride, containing approximately 12 percent by weight iron and 3 percent by weight HCl was continuously withdrawn from the vessel. The solution was filtered to remove insoluble impurities.

The ferrous chloride solution was fed into a vacuum crystallizer circuit which comprised a heater, crystallizer and a settler, all of acid resistant construction. Part of the ferrous chloride solution was continuously circulated to the heater at about 55° C., where it was indirectly heated to about 70° C. This hot solution was then sprayed into the crystallizer, which was kept at 50 mm. mercury absolute pressure, by a steam ejector system. Water and hydrogen chloride were evaporated from the solution because of the low pressure. As a result, the solution was cooled to about 55° C., and ferrous chloride crystals formed and collected in the settler at the base of the crystallizer. The excess liquor was recirculated to the heater, and fresh ferrous chloride solution was added to the circulating stream as it entered the heater.

The slurry of ferrous chloride crystals in the settler was pumped to a horizontal, continuous pusher centrifuge having wetted parts of titanium. The crystals were separated from the liquor in the centrifuge. The recovered crystals were then sprayed with about 5 percent of their own weight of water to remove adhering mother liquor. The damp crystals, containing about 93 percent of the iron fed to the circuit, were removed as $FeCl_2 \cdot 4H_2O$. The remaining 7 percent of iron input was removed as a bleed stream, to carry away soluble impurities such as nickel chloride. The wet ferrous chloride tetrahydrate crystals were then dried in a Raymond flash dryer to reduce the water associated with the ferrous chloride to between 1.5 and 2 moles per mole of ferrous chloride. During drying, the crystals were conveyed in an upwards flowing stream of hot combustion gases from a direct fired furnace. The gases entered at about 600° C. and left at about 135° C., carrying away the moisture evaporated. The crystals entered at about 40°–50° C. and left at about 100°–120° C., containing between 1.5 and 2 moles of water per mole of ferrous chloride. There was slight hydrolysis to oxide in the drier. Upon analysis, the crystals from the drier were found to contain:

|  | Percent |
|---|---|
| $FeCl_2$ | 72.5–82 |
| $Fe_2O_3$ | 3–7 |
| Impurities | 0.1–0.5 |
| $H_2O$ | 15–20 |

This material was taken whilst still hot and passed to a Komerek-Greaves Model 10.3–4 MS briqueting press, having two rolls 10 inches in diameter, with a roll pressure of 33 tons. Pillow-shaped briquets 1½ inches long, ⅞ inch wide, and ½ inch thick were formed.

4130 pounds of these briquets were loaded into a 3 foot 6 inch inside diameter reactor of stainless steel, externally insulated. The briquets were divided into three equal amounts and loaded on horizontal grids within the reactor. Each of the three beds was 2 feet thick and extended across the full diameter of the vessel. When the reactor had been closed up, and tested for leaks, the contained air was displaced with nitrogen, and the nitrogen was in turn displaced with hydrogen. Once the reactor was full of hydrogen, 984 pounds per hour of gas, of composition:

|  | Percent by weight |
|---|---|
| $H_2$ | 48 |
| $H_2O$ | 36 |
| $N_2$ and $CH_4$ | 14 | at a pressure of 3 p.s.i.g. and a temperature of 780° C. was passed upwards through the beds. Complete reduction was carried out in a period of 7 hours. At the start of the reduction, as the bed dried, the exit temperature was about 100° C., but after about one hour, the exit temperature rose to 570°–600° C. and remained there until the end of the reaction, when it again slowly began to rise.

When the reaction was completed, the iron beds were cooled with cold nitrogen. The hydrogen was then displaced with nitrogen before the beds were removed from the reactor.

The product iron sponge was chopped up and ground in a hammer mill, and had the following analysis and physical properties:

Apparent density—1.5–1.9
Flow rate—Nil
Composition:
    Hydrogen loss—0.3–0.5% by weight
    C—0.02%
    Cl—0.01–0.05% by weight
    Fe—Balance Example II This example shows the surprising improvement in reduction time which is obtained by the briquetting of the ferrous chloride.

6.5 pounds of ferrous chloride having a composition closely approximating $FeCl_2 \cdot 2H_2O$ was ground and sieved through a 100-mesh screen. The sieved material was then loaded into a 4 inch diameter cylindrical reactor having a bottom inlet for the supply of hydrogen. The reactor and the incoming hydrogen was heated in a vertical furnace to a temperature of 650° C. After 20 hours heating, at a hydrogen flow rate of about 20 standard cubic feet per hour, the reactor was allowed to cool down while maintaining a slow hydrogen flow. On opening the reactor, it was found that only about 1 percent by weight of the ferrous chloride had been reduced to iron metal in spite of the fact that more than enough hot hydrogen had been passed through the reactor to bring about complete reduction of the charge.

A further 10 pounds of the same ferrous chloride was ground and sieved through a 100-mesh screen. The sieved material was then compressed using a cylindrical die into a number of 1 inch diameter tablets. The tablets were then loaded into the same reactor to provide a bed depth of 9 inches. The reactor and the incoming hydrogen were heated in a vertical furnace to a temperature of 650° C. After 3½ hours heating. at a hydrogen flow rate of about 200 standard cubic feet per hour, the reactor was allowed to cool down while maintaining a slow hydrogen flow. On opening the reactor it was found that all of the ferrous chloride had been completely reduced to the iron state.

Example III

This example shows the increase in briquet strength obtained when hot, moist ferrous chloride is used.

The strength of a briquet was measured by the compressive force required to crush it in the cold state. Since briquets of ferrous chloride weaken on keeping, particularly in a damp atmosphere, the strength tests were made as soon as the briquets had cooled.

Owing to the variation from briquet to briquet, a range of values is quoted in each case:

Crushing strength, lbs.
Ferrous chloride containing 1.6 moles water per mole ferrous chloride:
    As produced in drier _____ 250–350
    After cooling to room temperature ____ 200–300

Example IV

This example shows the utility of the process when applied to nickel chloride.

Commercial grade nickel chloride having the approximate formula $NiCl_2.6H_2O$ was dehydrated to give 145 grams of nickel chloride having the approximate formula $NiCl_2.1.7H_2O$. This material was pelletized in a 1¼ inch diameter cylindrical form at 8000 pounds per square inch to provide pellets weighing 14 grams each. The pellets were charged into a 4.25 inch diameter stainless steel tube reactor. Preheated hydrogen was then flowed through the reactor as follows:

|  | Minutes |
|---|---|
| 345° C. at 40 cu. ft./hr. | 117 |
| 500° C. at 40 cu. ft./hr. | 45 |

Analysis of the product pellets showed that they were completely reduced.

Example V

This example shows the utility of the process when applied to cobalt chloride.

Commercial grade cobalt chloride having the approximate formula $CoCl_2.6H_2O$ was dehydrated to give 150 grams of cobalt chloride having the approximate formula $CoCl_2.0.66H_2O$ This material was pelletized in a 1¼ inch diameter cylindrical form at 8000 pounds per square inch to provide pellets weighing about 14 grams each. The pellets were charged into a 4.25 inch diameter stainless steel tube reactor. Preheated hydrogen was then flowed through the reactor as follows:

|  | Minutes |
|---|---|
| 548° C. at 40 cu. ft./hr. | 30 |
| 405° C. at 40 cu. ft./hr. | 67 |

Analysis of the product pellets showed that they were completely reduced.

It will be appreciated that useful rates of reduction of nickel chloride commence at about 300° C., cobalt chloride at about 400° C. and iron chloride at about 500° C. The temperatures at which the bed of material being reduced is maintained can quite obviously be varied substantially above these lower limits.

Example VI

This example shows that ferric oxide may successfully be reduced with hot hydrogen when admixed with ferrous chloride prior to reduction to produce a non-pyrophoric product.

A number of powder mixtures of $FeCl_2$ and $Fe_2O_3$ were prepared. The $FeCl_2$ had the approximate formula $FeCl_2 \cdot 1.6H_2O$ and could pass through a 40-mesh screen. The $Fe_2O_3$ was a concentrate of specular hematite and could pass through a 150-mesh screen. The two materials were mixed in the amounts shown in Table 1:

TABLE 1

| Weight of $FeCl_2$ $1.6H_2O$ (grams): | Weight of specular hematite (grams) |
|---|---|
| 14.0 | Nil |
| 14.0 | 1.4 |
| 14.0 | 2.8 |
| 14.0 | 5.6 |
| 10.0 | 10.0 |
| 5.6 | 14.0 |

The mixtures were pressed in a die at 8000 p.s.i. to yield cylindrical pellets 1¼ inch in diameter; the thickness of the pellets vary from about 0.4 to 0.5 inch. The pellets were reduced individually with hydrogen at a temperature of 585° C., the course of the chloride reduction being followed by continuous absorption and titration of the resulting hydrogen chloride. In all cases where chloride originally predominated in the mixture, no effect by oxide on the reduction rate of chloride could be detected. When the pellets contained 50 percent or more oxide there was a slight initial retardation of chloride reduction probably arising from competition by the oxide for heat and hydrogen. In all cases reduction was complete within 1 hour and the resulting iron metal sponge was in all cases non-pyrophoric.

By contrast 14.0 grams of the hematite (without any chloride) placed in a shallow iron container 1¼ inch in diameter was evidently fully reduced after one hour in hydrogen at 585° C., but was found to be pyrophoric after cooling and removal from the reduction apparatus.

It appears that the reaction processes, as typified by the equations below, proceed in a manner essentially independent of each other provided the supply of hot hydrogen is adequate:

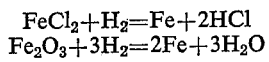

$$FeCl_2 + H_2 = Fe + 2HCl$$
$$Fe_2O_3 + 3H_2 = 2Fe + 3H_2O$$

It is known that the time required for reduction under any given conditions is generally proportional to the linear dimensions of the particle in both the oxide and chloride cases. However, pellets or briquets prepared from mixtures of oxide and chloride have been found to react at a rate governed by the overall pellet size so far as chloride reduction is concerned, but at a rate largely governed by individual grain size in the case of the oxide contained therein. The presently described process therefore constitutes a means for attaining the desirable end of contacting a fine dispersion of iron oxide with hydrogen in order to achieve high reduction rates.

The presence of a fine oxide dispersion in pelletized or briqueted ferrous chloride is particularly advantageous in the technical production of iron chloride route since it enables the overall heat economy (in terms of iron units produced) to be considerably improved. This arises from the fact that the reduction equilibrium in the case of oxide reduction is much more favourable than that of chloride reduction, especially at relatively low temperatures in the range 575°–400° C. It is in fact possible to design a continuous counter-current reduction process in which preheated hydrogen is lead into the system at, for example, 775° C. under such conditions that essentially only chloride is reduced as the hydrogen temperature decreases to about 575° C., while oxide reduction predominates in the reaction zone corresponding to a further temperature drop from 575° C. to 400° C. The heat remaining in the hydrogen is then available for any required dehydration of the ferrous chloride. The relatively cool hydrogen can then be further cooled and stripped of excess water and hydrogen chloride for economical recycling through the preheater and reduction furnace. In the reduction of ferrous chloride containing no oxide the hydrogen heat corresponding to the temperature drop from 575° C. to 400° C. is largely wasted when high reduction rates are required.

The value of the present invention becomes obvious when it is realized that, because of the lower heat of reduction of oxide as compared with chloride, it is possible in some reduction systems to achieve as much as a threefold increase in iron output for a given flow of hot hydrogen simply by blending the appropriate amount of oxide with the ferrous chloride prior to the pelletizing or briqueting stage. It should be noticed that some increase in the pressure of the hot hydrogen may be desirable, in cases where the oxide content of the pellet or briquet is high, in the interest of improved heat transfer and rate of reaction through greater mass-action.

What we claim is:

1. A method for converting (a) particulate metal chloride, selected from the group consisting of ferrous, nickel and cobalt chlorides, to metal which comprises:
    agglomerating the metal chloride particles into curviform agglomerates;
    accumulating a plurality of the agglomerates in the form of a porous bed within a reactor; and
    flowing hydrogen pre-heated to a temperature greater than the melting temperature of the metal chloride through the porous bed to reduce the metal chloride to metal, said hydrogen being supplied at a rate and in an amount sufficient to provide substantially all the total heat requirement for reduction.

2. The method of claim 1 wherein the metal chloride is ferrous chloride.

3. The method of claim 2 wherein:
    the ferrous chloride particles are agglomerated by compacting to form briquets; and
    the briquets are accumulated in the form of a porous, fixed bed, the thickness of the said bed being sufficiently small so that the bottom layer of briquets is not crushed to any substantial extent during reduction.

4. The method of claim 3 wherein the briquets are formed by compacting moist, hot, hydrated ferrous chloride having between 1 and 2 waters of hydration associated therewith.

5. The method of claim 4 wherein the hydrogen is preheated to a temperature greater than about 700° C. and exhausted at a temperature greater than about 550° C.

6. The method of claim 2 wherein iron oxide particles are admixed with the ferrous chloride particles prior to agglomerating and reduction is continued until both the iron oxide and ferrous chloride are converted to iron.

7. A method for converting ferrous chloride, which has been crystallized from solution, to metal which comprises:
    partially dehydrating the ferrous chloride crystals until they have between 1 and 2 waters of hydration associated therewith;
    compacting the partially dehydrated crystals into curviform briquets;
    accumulating a plurality of the briquets in the form of a porous, fixed bed within a reactor, the thickness of the bed being sufficiently small so that the bottom layer of briquets is not crushed to any substantial extent during reduction; and
    flowing hydrogen, pre-heated to a temperature greater than about 700° C. through the bed to reduce the ferrous chloride to iron, said hydrogen being supplied at a rate and in an amount sufficient to provide substantially all the total heat requirements for reduction, said hydrogen being exhausted from the reactor at a temperature greater than about 550° C.

References Cited

UNITED STATES PATENTS

| | | | |
|---|---|---|---|
| 2,701,761 | 2/1955 | Crowley | 75—34 |
| 2,709,131 | 5/1955 | Marshall | 75—113X |
| 2,716,601 | 8/1955 | Crowley | 75—34 |
| 3,244,512 | 4/1966 | Gravenor et al. | 75—34X |

L. DEWAYNE RUTLEDGE, Primary Examiner

G. K. WHITE, Assistant Examiner

U.S. Cl. X.R.

75—82, 90, 91